March 1, 1938.   J. O. CRABTREE   2,109,768
INK DISTRIBUTION IN PRINTING MACHINES
Filed Feb. 20, 1936   9 Sheets-Sheet 5

Inventor
J. O. Crabtree
by
W. E. Evans
Attorney

March 1, 1938.　　J. O. CRABTREE　　2,109,768
INK DISTRIBUTION IN PRINTING MACHINES
Filed Feb. 20, 1936　　9 Sheets-Sheet 7

Inventor
J. O. Crabtree
by
W. E. Evans
Attorney.

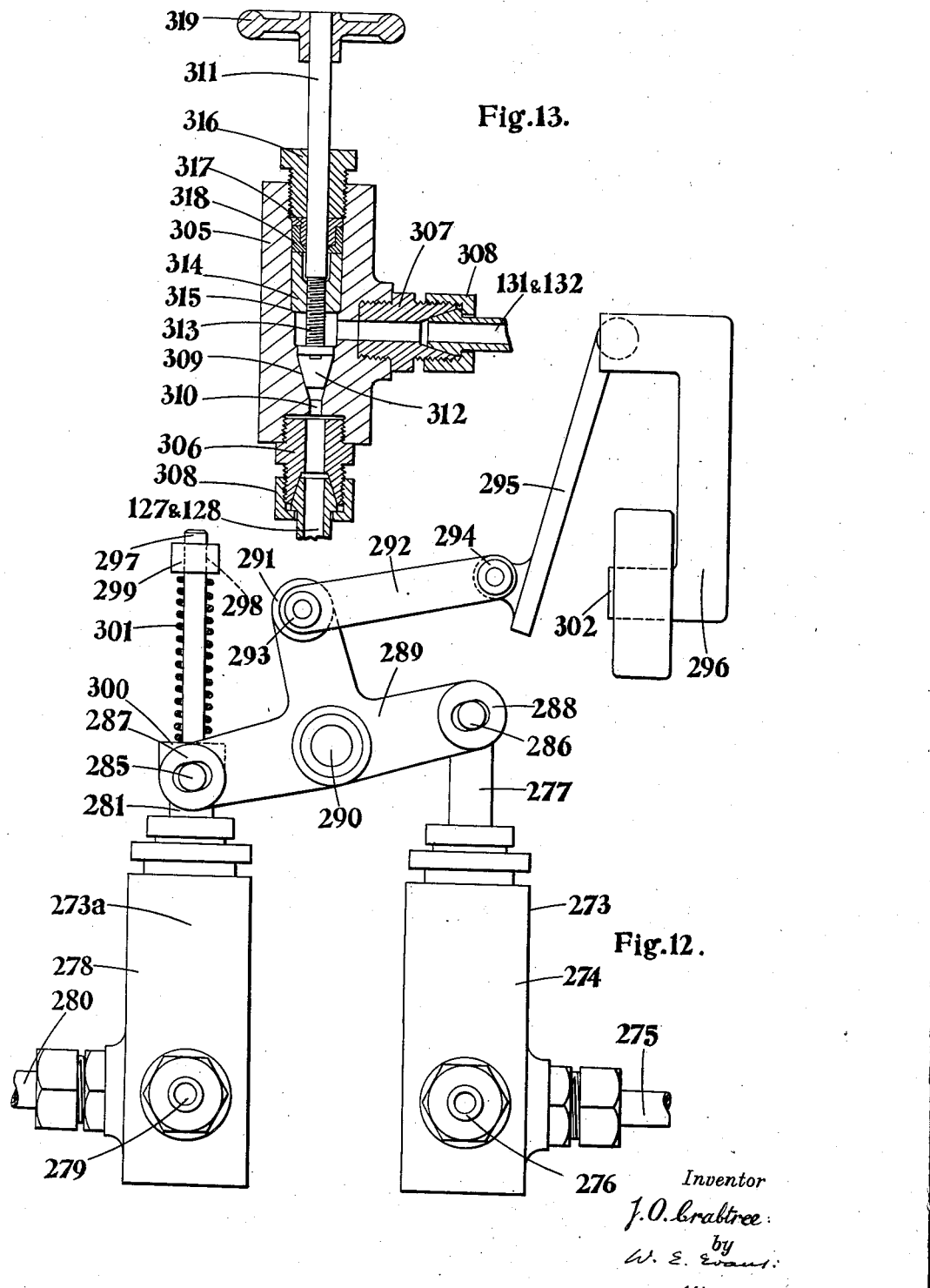

March 1, 1938. J. O. CRABTREE 2,109,768
INK DISTRIBUTION IN PRINTING MACHINES
Filed Feb. 20, 1936 9 Sheets-Sheet 9

Inventor
J. O. Crabtree
by
W. E. Evans
Attorney.

Patented Mar. 1, 1938

2,109,768

UNITED STATES PATENT OFFICE 2,109,768

INK DISTRIBUTION IN PRINTING MACHINES

John Oldfield Crabtree, Hillcrest Thorner, England, assignor to R. W. Crabtree & Sons Limited, Leeds, England Application February 20, 1936, Serial No. 64,903
In Great Britain December 11, 1934

16 Claims. (Cl. 101—350)

This invention relates generally to rotary printing presses and is more particularly concerned with the mechanism for supplying the ink from the fountain, the mechanisms for distributing the ink and the mechanisms for supplying the ink to the plate or printing surface.

In rotary machines for printing newspapers, magazines, or other products the ink is usually fed by means of an ink fountain, ink pump, or ink duct to a series of metal drums or cylinders, upon which rollers are applied with their peripheral surfaces in contact with those of the drums or cylinders, each of such rollers being covered with an external peripheral layer of a resilient substance. Rollers similarly covered are also used to transfer the ink from the last metal drum or cylinder of the ink distributing equipment to the printing surface in a fine homogeneous film or layer. The metal drums or cylinders which are usually carried between the ink fountain and the printing surface, or printing cylinder, are employed for the purpose of distributing the ink in conjunction with the resiliently covered rollers, which are in contact with them. It is common practice to arrange that these drums or cylinders and these resiliently covered rollers shall be given a relative reciprocating movement in the axial direction in order to facilitate the evening out of the ink so that the necessary homogeneous layer may be supplied to the printing surface.

In order to obtain the best results it is necessary that the respective resiliently covered rollers hereinafter called resilient rollers, should be set in a determined position in relation to and in contact with the respective metal drum or cylinders or with the metal drum or cylinders and the printing surfaces, or that a determined pressure should be applied by the resilient rollers upon the peripheral surface of the drums or cylinders, or upon the printing surface according to the actual practical conditions obtaining, such as the quality of the ink used, the physical characteristics of the resilient substance of the covering of the resilient rollers, and the character of the printing surface.

In order that the appropriate position or pressure hereinbefore referred to may be maintained or applied, it is necessary that provision be made for adjustment or alteration of the position of the resilient rollers with respect to the drums or cylinders or the printing surfaces with which they co-operate. Various means are commonly employed for this purpose, involving the individual manual setting of the resilient rollers. The usual method of determining the setting of the resilient rollers in contact with their respective drums or printing surfaces in order that they may apply a determined pressure to the respective drums and cylinders or printing surfaces is as follows:

The pressure which any resilient roller exerts upon the corresponding drum or cylinder, or printing surface, is considered to be represented by the arc of the peripheral surface of the resilient roller in contact with the periphery of the respective drum or cylinder or printing surface. The length of the arc of the periphery in contact with the surface of the drum or cylinder or printing surface is approximately measured by removing the resilient roller from contact with its respective drum or cylinder, or printing surface, inserting a piece of plain paper between the resilient roller and the drum or cylinder or printing surface, applying ink to the surface of the covering of the resilient roller, and returning the resilient roller to its determined position to which it is adjusted by the usual manual means. The pressure of the inked surface of the resilient covering against the surface of the drum or cylinder, or printing surface marks the paper with a layer of ink approximately corresponding in width to the length of arc of the periphery of the covering of the resilient roller in contact with the surface of the drum or cylinder, or printing surface. A standard width of the ink mark upon the paper is determined depending upon the diameter of the periphery of the covering of the resilient roller or the composition of the resilient substance forming the covering, or the quality of the ink, or the type of printing surface, and when the contact of the roller with its respective drum or cylinder, or printing surface, is such as to produce this width of ink mark, the roller is considered to be in its correct position and exerting the correct pressure on the surface of its respective drum or cylinder, or printing surface. In the initial stage of setting the rollers for operation, an ink mark on paper is produced by this method and is compared with the standard mark and depending upon the difference between the width of these two marks the position of the resilient roller with respect to its respective drum or cylinder, or printing surface, is altered by means of the manual adjusting means provided until after successive tests the contact between the roller and its respective drum or cylinder, or printing surface, is found to give a width of marking on the paper corresponding to that of the standard marking. Each roller is set at each end by this means.

It is of general experience with such resilient rollers that the resilient substance of the covering of the rollers has a tendency to expand or contract under changing atmospheric or operating conditions, and that after the press has been stopped for any considerable length of time, such as a day or a night, it is necessary to re-set all the rollers in order to obtain the desired result.

Moreover such resilient rollers may expand or contract under working conditions during a run of the press and thus without the knowledge of the operator the length of arc of the periphery of the resilient roller in contact with the respective drum or cylinder, or printing surface, may alter and thus the pressure exerted by the rollers upon these respective surfaces may alter. This alteration of pressure results in faulty distribution of the ink and spoiling of the printed impression.

The resilient rollers may expand to such an extent that they exert an excessive pressure on the respective surfaces. This excessive pressure may cause the covering of the roller to heat up and melt or burst or become locally deformed, such occurrence causing stoppages in the press by reason of the resilient covering of the roller leaving the surface of the roller and coming into contact with the paper or printing surface and thus ruining the printing surfaces and breaking the paper web. Similarly, where the covering of the resilient rollers contracts, the rollers do not exert the necessary pressure on their respective drums or cylinders, or printing surfaces and the ink distributing mechanism is thus rendered inefficient and an insufficient supply of ink is transmitted to the respective printing surfaces.

The stoppages of the press due to the circumstances hereinbefore described and the adjusting or changing of the resilient rollers are sources of great waste of time and decrease of efficiency in connection with the printing press.

Moreover, with such resilient rollers, in the event of the paper web breaking when the press is running at speed, a certain amount of paper becomes wound round the resilient rollers, thus increasing the time required to re-thread the web through the press and in some instances damaging the resilient surface of the rollers.

The invention has among its objects to avoid these disadvantages by an improvement in the conditions under which pressure is applied to the resilient rollers, to provide means by which the particular pressure applied by the resilient rollers may be determined or adjusted at will without stopping the press, and as its chief object to support the rollers in such a manner that they shall always exert a determined pressure upon their respective drums or cylinders, or printing surfaces, whatever may be the atmospheric or operating conditions thus avoiding the disadvantages experienced due to the expansion or contraction of the resilient rollers under these differing conditions. In the case of the resilient rollers serving as the forme-inking rollers, the invention has also for its object to provide for the said rollers to be locked in position after setting, such locking of position being determined at will without stopping the press.

A further object of the invention is to provide the resilient rollers with means whereby when they are withdrawn from their operative positions, they may be caused automatically to re-set themselves in the said operative position in which they shall exert the necessary determined pressure upon their drums or cylinders, or printing surfaces, without the necessity of manual adjustment of each individual roller, thus avoiding the loss of time necessitated by the aforementioned manual adjustment described above.

Another object of this invention is to provide means for supporting the resilient rollers in contact with their respective drums or cylinders, or printing surfaces, so that in an emergency, such as the breaking of the paper web or the stopping of the press, all such rollers shall be removed from contact with their respective drums or cylinders, or printing surfaces.

The invention consists in the provision, in a rotary printing press, of inking rollers having bearings that are adjustable towards and away from the drums, cylinders or surfaces with which the rollers co-operate, the said rollers being set into the operative position under the action of adjusting elements subjected to pressure applied hydraulically or pneumatically by a fluid pressure medium whereby the rollers are pressed with a determined pressure resiliently into contact with their co-operating surfaces. In the case of the ink distributor rollers the said adjusting elements serve also to maintain the rollers in the operative positions, whereas the forme-inking rollers are locked in position.

The pressure exerted by the fluid pressure medium may be opposed by a force which may be termed the throw-off force and which may be exerted by a fluid pressure medium acting in a cylinder or chamber in a direction parallel with the lateral movement of the roller bearings, the cylinder or chamber having a movable element, such as a plunger, that is adapted to be locked or constrained relatively to the particular bearing. Alternatively, the throw-off pressure may be provided to be applied mechanically as by means of a spring or springs which may act directly upon the bearing.

In the case of the forme-inking rollers there are provided means for locking the bearings of the rollers in the position to which they are set by the fluid pressure medium, and such means may be operated manually or may be operated electromagnetically, hydraulically or pneumatically. Thus, the bearings may be locked after being set in the required positions by means of clamping or constraining members which are moved into and out of the locking position under the control or operation of adjusting elements acting in cylinders or chambers to which a fluid pressure medium is supplied.

The roller bearings are advantageously constructed to be capable of a limited axial movement for the release of the rollers, the bearings being locked against such axial movement when in the operative position.

The ink fountain is advantageously provided to be adjustable into and out of the operative position by means of a fluid pressure medium acting in a cylinder or chamber having a movable element, such as a plunger, that is provided to act upon the fountain, and the action of such movable element may be effected simultaneously with the action of the movable elements operating upon the roller bearings.

The adjusting or movable elements effecting the several operations, that is to say, the setting of the bearings of the rollers, the application of the throw-off pressure to the said bearings, the actuation of the clamping or constraining members applied to the bearings of the forme-inking rollers, and the adjustment of the ink fountain, are provided in cylinders or chambers that are connected into a circuit or circuits for the fluid pressure medium, the pressure upon which is maintained directly by a pump or pumps, or by a suitable accumulator. The said circuits may be provided with control or release valves that are operative in respect of the whole circuit or alternatively with control or release valves that apply to local sections of a circuit or to one or more sets of bearings, and such control or release valves may be adapted for operation from a central station or from determined controlling positions or local controls. Such operation of the control or release valves may be effected electrically by the provision of suitable electrical circuits in which are included electro-magnetic devices, such as relays, switches and magnets for adjusting the setting of the said valves. The electrical control circuits may be such that upon the stopping of the motor driving the press the inking and forme-inking rollers are withdrawn from the surfaces with which they co-operate, and the ink fountain may similarly be withdrawn from the operative position when the press is stopped.

The invention further comprises the features hereinafter described:—

In order that the said invention may be clearly understood and be readily carried into effect, the same will now be described, by way of example, more fully with reference to the accompanying drawings, in which:—

Figure 12 shows a general arrangement of the control valve mechanism arranged to operate the forme-inking roller locking mechanism.

Figure 13 is a longitudinal sectional view of the valve for adjusting the pressure upon any group or groups of bearings.

Figure 14 is a side-elevation of the ink fountain and its accessory mechanism showing the support and the means for locating it in position.

In the mechanism hereinafter described with reference to the accompanying drawings, the ink drums are arranged to reciprocate and the distributor rollers are arranged to remain stationary. Alternatively, it is possible to arrange the ink drums to remain stationary and to arrange mechanism so that the distributor rollers shall be made to reciprocate. In the mechanism hereinafter described the ink is supplied to the ink distributor by means of a fountain roller supplying the first ink drum direct. Alternatively, it is possible to arrange for the ink to be supplied to the ink distributor by means of a standard ductor roller mechanism, or a suitable ink pump mechanism may be provided.

In the arrangement hereinafter described all the resilient rollers are arranged to be applied to the surfaces with which they respectively co-operate by the fluid pressure means. It is, however, possible to arrange that certain rollers shall be operated by the fluid pressure means and others shall be operated by manually adjusted means. In the same manner, in the mechanism hereinafter described, the ink fountain is also arranged to be operated by the fluid pressure means, but such arrangement is not essential.

Figure 1:
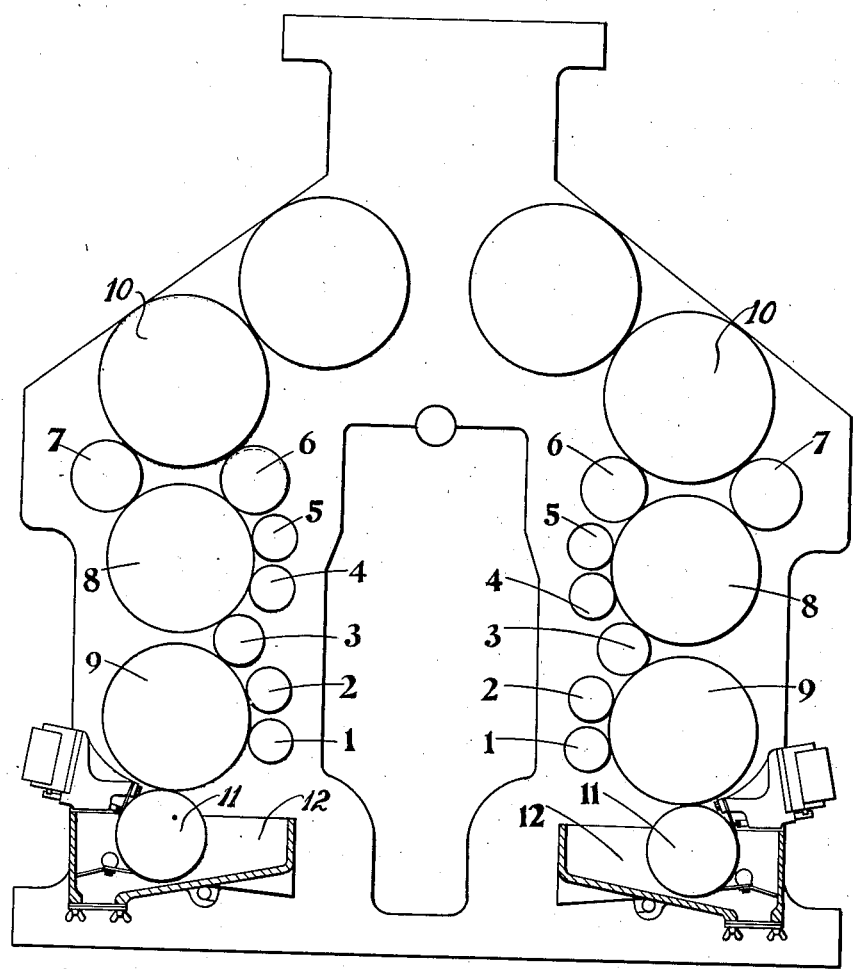
Figure 1 is a diagrammatic side-view of a printing unit showing the general arrangement of the printing cylinders, distribution drums and cylinders, distribution rollers, forme-inking rollers, and ink fountains.
Figure 2:
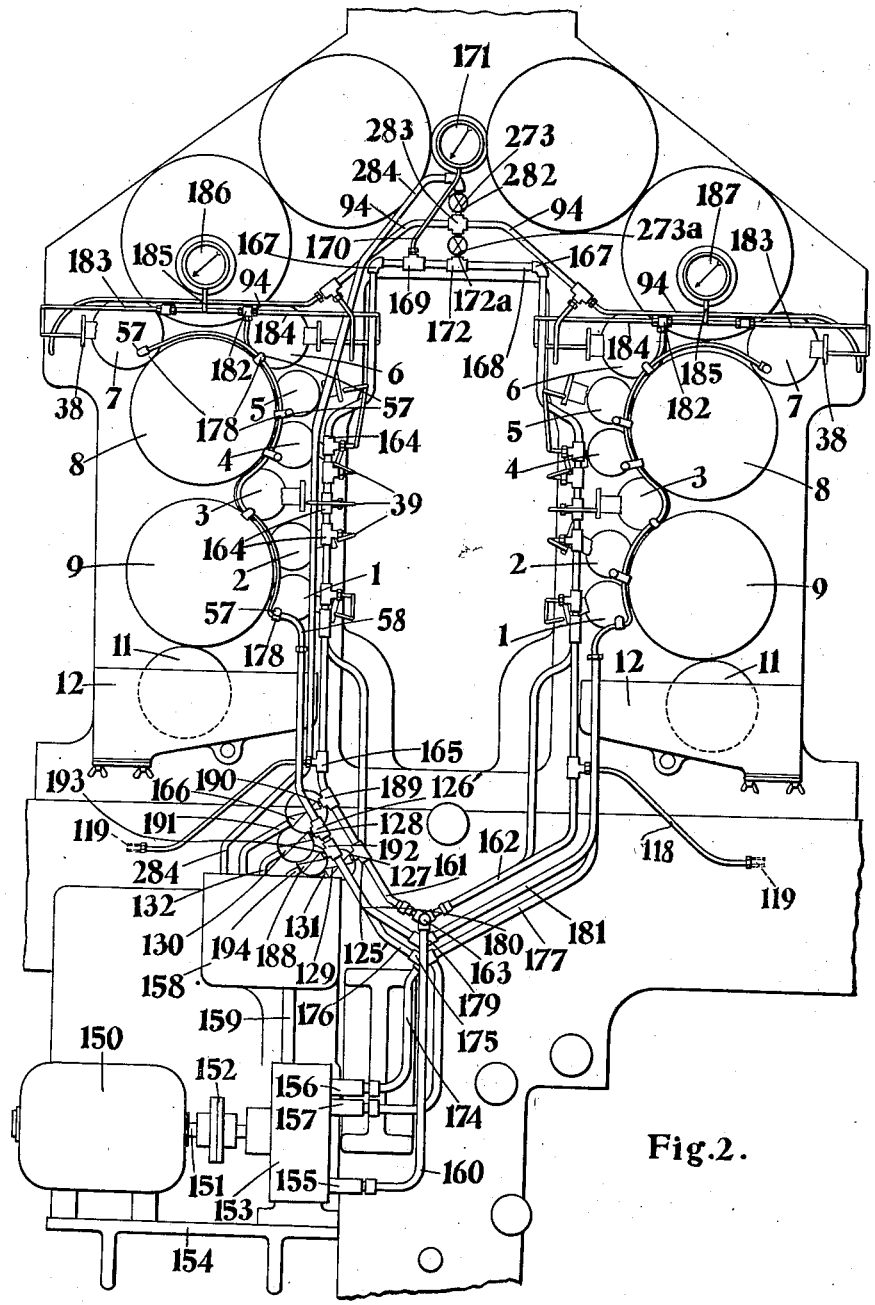
Figure 2 is a side-elevation of the single printing unit shown in Figure 1, illustrating a construction embodying the present invention and showing the pipes for the liquid or gaseous medium.

Referring now to Figures 1 and 2 of the drawings, the distributor rollers are indicated 1, 2, 3, 4, 5 and are shown in full lines.

The forme-inking rollers 6, 7 are shown in the same manner. The ink drums 8, 9 are mounted in bearings arranged to permit rotation and reciprocation, for example, by means of suitable cam drives, which form no part of the present invention.

Ink is supplied to the lower rotating drum 9, in any of the usual manners by means of a fountain roller 11, from an ink fountain 12. The ink supplied to the drum 9, is then transferred by means of the distributor roller 3 to distributing drum 8 and thence by forme rollers 6, 7 in a thin even homogeneous layer to the printing surface 10.

Figure 3:
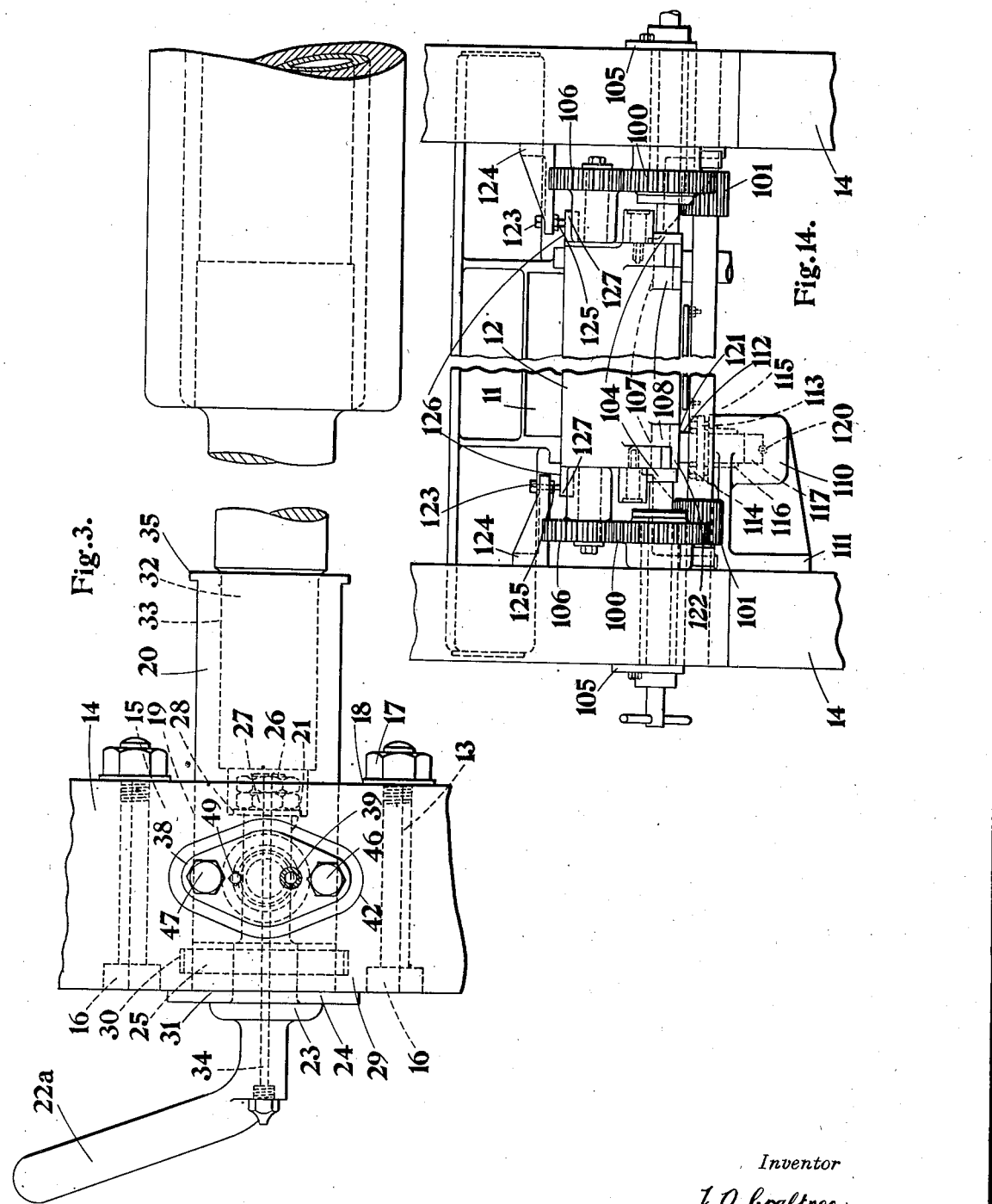
Figure 3 is a general side-elevation of one of the bearings supporting the resilient rollers.
Figure 4:
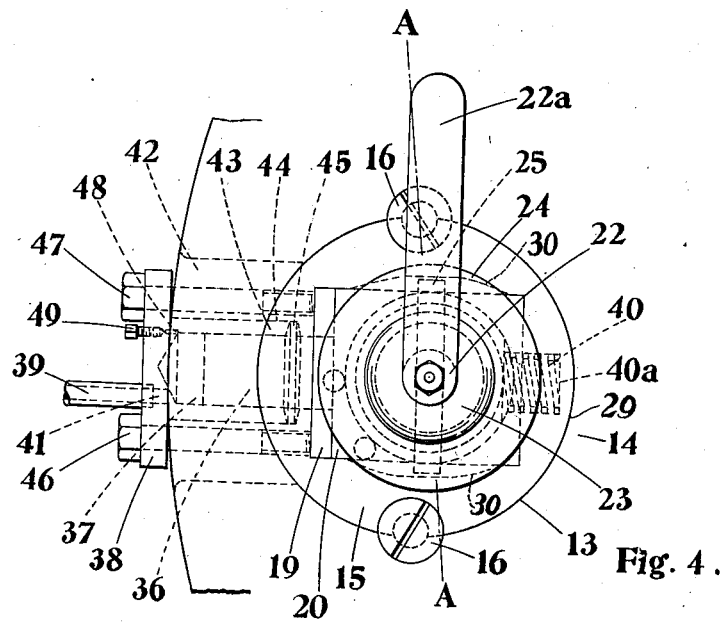
Figure 4 is an end view of one of the bearings for supporting the resilient rollers.
Figure 5:
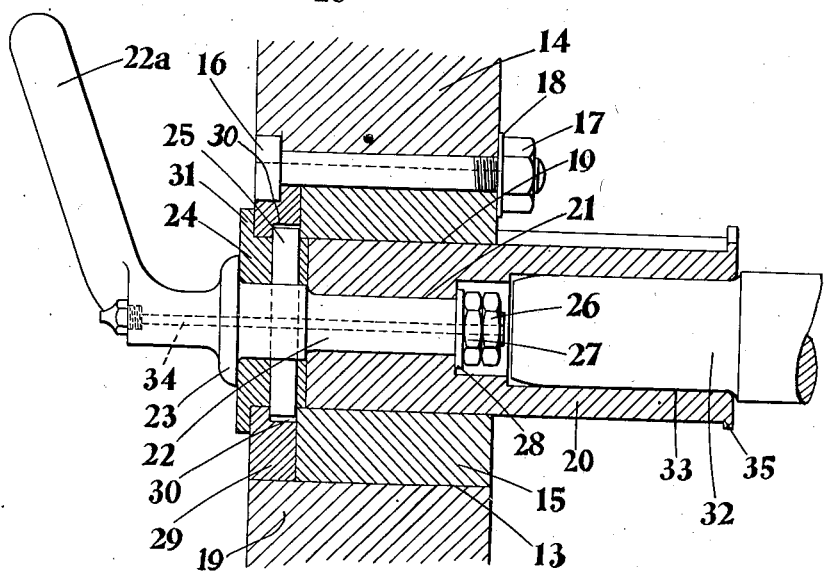
Figure 5 is a section through the line 5—5 in Figure 4, showing a sectionalized side view of the bearing for supporting the resilient rollers through this line.

The distributor rollers are supported in bearings generally as shown in Figures 3, 4, 5.

For each roller spindle a bore 13 is machined in the frame unit 14 into which fits a bush 15 which is located and held in position by bolts 16 the hole for which is formed partly in the bush 15 and partly in the frame unit 14, and by nuts and washers 17 and 18. Bush 15 has a broached hole 19 into which fits bearing 20, provision being made, as shown in Figure 4, by forming the broached hole 19 of greater width than the bearing 20, so that the bearing may slide laterally either towards or away from ink drums 8 or 9. Bearing 20 is formed with a bored hole 21 in which fits the circular shank 22 of the handle 22a, which is provided with a flange 23 against which abuts a collar 24 flanged at the outer face. Collar 24 is secured to handle 22a by means of a pin 25 which is a drive fit in both. Bearing 20 is connected to handle 22a by means of lock-nuts 26, 27 and washer 28. The shank 22 of the handle 22a is made to such dimensions that a small clearance is permitted between the shoulder inside bearing 20 and the washer 28, thus allowing the shank 22 of handle 22a and collar 24 to rotate without binding with respect to bearing 20.

A loose ring 29 is arranged to fit into the bore 13 and to provide recesses 30 in which the ends of the pin 25 may move for the purpose of locking bearing 20 in position. The loose ring 29 is arranged so that the smaller diameter of the collar 24 shall fit inside it, the entry of the collar being determined by the shoulder or flange 31. The recesses 30 are machined to dimensions which will allow clearance for the pin 25 to move freely in either direction about the axis of the shank 22.

The journal 32 of the resilient roller rotates in a bore 33 machined in bearing 20. If a plain journal is used, lubrication is effected by means of channel 34 in the shank 22 of handle 22a.

When it is required to remove the roller from the press, handle 22a is moved through an arc of 45 degrees when the ends of the pin 25 leave the recesses 30 and emerge into the hole in the ring 29 corresponding to the hole 19. The handle 22a, with collar 24 and bearing 20, may then be withdrawn until the flanges 35 at the inner end of the bush 20 contacts with the bush 15. The bearing 20 is thus moved into a position in which it is clear of the end of the journal 32. When the same movement of the bearing at the other end of the roller is effected, the roller is then free to be removed laterally.

The lateral adjustment of position of bearing 20 in the hole 19 is determined by the pressure exerted on the bearing by a throw-off medium, either fluid or mechanical, as hereinafter described, in the one direction and in the other direction by the pressure exerted by the plunger 36, the face of which contacts with the lateral vertical face of bearing 20. Plunger 36 moves in the chamber or cylinder 37 which is machined in the gland 38, in response to the pressure exerted by the fluid in the chamber or cylinder, the pressure of this fluid being controlled from the pressure source through the conduit 39, which is led directly to gland 38, being connected to the chamber or cylinder by means of a small inlet 41. Gland 38 is fitted in a stuffing box 42 inserted through a cored hole in the frame unit 14, directly against the bush 15 the portion 43 of the gland being inserted into the machined hole 44 in the bush 15. The whole is hydraulically sealed by means of the packing washer 45. The gland 38 is bolted to the bush 15 by means of bolts 46 and 47, which bolts also control the pressure on the packing washer 45.

In order to expel any air which may be present in the system, a small diameter vent hole 48 is provided in the back of gland 38 leading to the pressure chamber or cylinder 37. This vent is controlled by the screw 49 which is arranged with a hardened tapered head.

The lateral movement of the bearing 20 towards the drum 8 or 9 may advantageously be opposed by a constant force provided by pressure exerted by a fluid medium in order that the throw-off force opposing the pressure holding the rollers in contact with their respective drums or cylinders, or printing surfaces, shall not vary with the variation of the position of the centre of the bearing 20.

Figure 6:
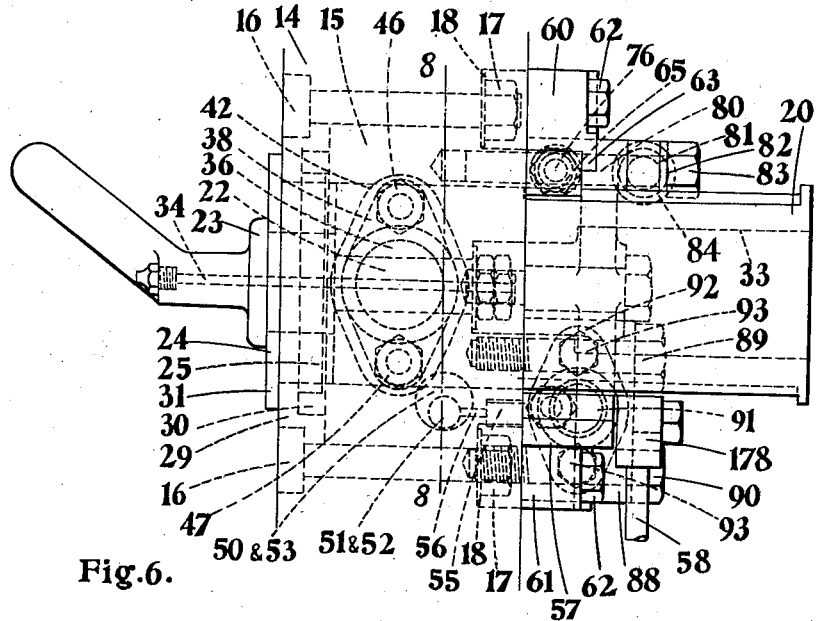
Figure 6 is a side-elevation of one bearing arranged for supporting a forme-inking roller showing especially the means for hydraulically locking the roller in position once it has been set.
Figure 8:
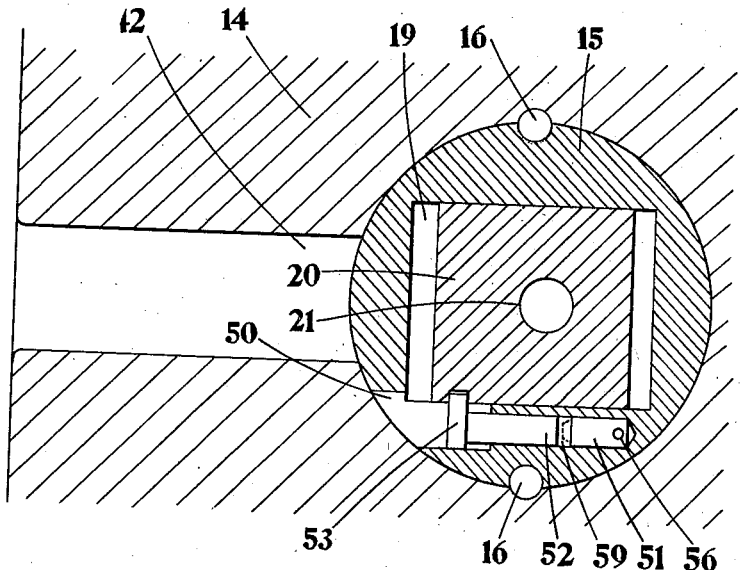
Figure 8 is a section through the line 8—8 in Figure 6, showing a sectionalized end view of the bearings for supporting the forme rollers.

In the method of construction preferred and in which a fluid pressure force is employed (Figures 6 and 8), hole 50 is drilled into bush 15 parallel to the slot or hole 19 and sufficiently close thereto to break into the said slot or hole. Hole 51, which is drilled eccentrically from and continues in the same direction as hole 50, receives plunger 52 arranged to slide therein. Head 53 is turned eccentrically on the plunger 52 and slidably fits the hole 50, so that it projects into the slot or hole 19 and can thus engage in a slot in the bearing 20 cut parallel with the axis thereof. A tapped hole 55 is drilled into the inside face of bush 15 and this is connected with bore 51 through the small hole 56. Union 57 is fitted into the tapped hole 55 and to this is connected the conduit 58. Fluid is applied from a pressure source which is hereinafter described, through conduit 58 to the plunger 52. This fluid pressure acts upon plunger 52 which is packed by cup washer 59 and thus applies a constant force represented by the pressure of the fluid acting in the opposite direction to that applied by plunger 36.

An alternative method of providing an opposing force to that applied by plunger 36 is by means of spring pressure. A spring 40, Figure 4, is housed in a clearance hole 40a drilled in bush 15. One face of the spring is arranged to be received into a recess in the opposite face of bearing 20 to that in contact with plunger 36. In this method the pressure exerted by the roller is only approximately constant, since the force exerted by the spring varies with the compression of the spring.

The bearings of the forme-inking rollers are designed substantially in accordance with the details of construction of the bearings for the distributor rollers.

In view of the varying pressure between the forme-inking roller and the plate cylinder due to the uneven surface of the plate and the gap between the various plates on the cylinder, means must be provided to ensure that the position of the axis of the forme-inking roller does not vary with this varying pressure from the printing surface.

In the mechanism illustrated the forme-inking roller is set by means such as those hereinbefore described and after being set is locked in position by means of a mechanical locking device. This locking device may be operated for each end of each forme inking roller, manually electro-magnetically, or by hydraulic or pneumatic pressure. In the preferred construction the last named means are incorporated and the details of construction are as hereinafter described.

Figure 7:
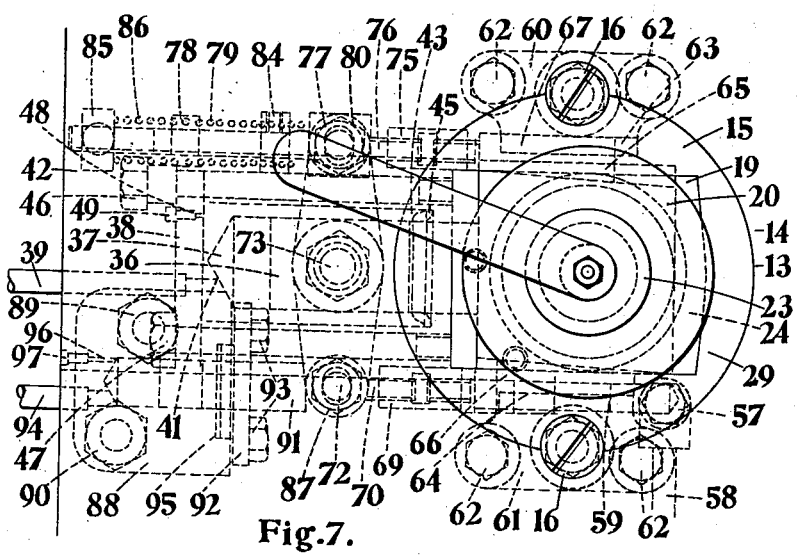
Figure 7 is an end view of the forme-inking roller bearing as shown in Figure 6.
Figure 9:
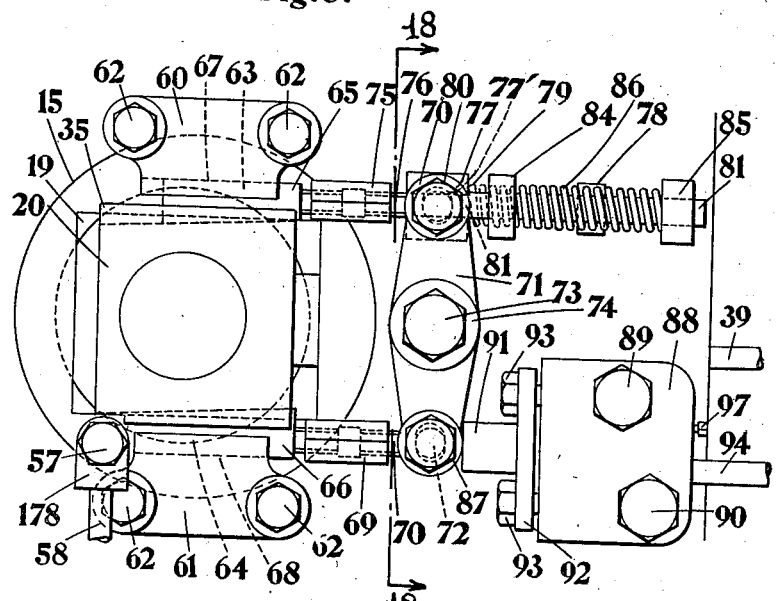
Figure 9 shows a view in elevation of the mechanism shown in Figures 6 and 7 as seen from the inside of the press frame when viewed in the direction of the axis of the supported roller.

Slideways 60 and 61 (Figures 7, 8 and 9) are bolted to the inside of the press frame unit 14 by four bolts 62. Slideways 60 and 61 are provided with flanges 63 and 64 and the slideways are mounted on the press frame one immediately above and one immediately below the centre of bearing 20.

The rear portions of the upper and lower surfaces of bearing 20 which do not bear upon the inside faces of the broached hole 19 in bush 15 when the bearing 20 is in the operative position are machined with a small inclination or bevel, the upper and lower inclined surfaces being parallel. Wedges 65 and 66 are provided on the inner sides adjacent the bearing 20 with inclined surfaces corresponding to the machined surfaces of bearing 20 and are arranged to be of such a thickness that they will move freely between the flanges 63 and 64 and the frame 14 respectively. The outer faces of wedges 65 and 66 are formed to be parallel to the machined faces 67 and 68 of slide-ways 60 and 61. Wedges 65 and 66 are arranged to move in contact with the respective surfaces of slides 60 and 61 and the respective inclined surfaces of bearing 20, the inclined surfaces of the wedges being parallel to the inclined surfaces of the bearing.

Figure 18:
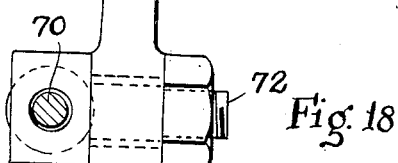
Figure 18 is a side elevation of part of the mechanism represented in Figure 9 taken on the line 18—18 in Figure 9, the view being taken towards the right-hand.

The wedge 66 is provided with a screw-threaded shank which is connected through the turn buckle 69 with the screwed shank 70 of an eye or sleeve fitted to a double armed lever 71 by pin 72 (Figure 18). Lever 71 is pivoted on stud 73 which is fixed, as by screwing, to the frame and machined in such a manner that the shoulder or plain portion of the stud which passes through the boss 74 of lever 71 is rather longer than the boss, allowing free rotational movement of the lever.

Wedge 65 is similarly connected by turn buckle 75 to the screwed shank 76 passing through an eye or sleeve also pinned to the lever 71. On the opposite side of the lever poppet 77 is rotatably fitted to the pin 80 which passes through the corresponding boss of the lever 71. The eyes or sleeves and the poppet 77 are provided each with a transversely elongated hole, such as 77', in order to provide for the movement of the lever 71. Alternatively the lever 71 may be provided with elongated holes to receive the pins. The shank 76, extended on the far side of the eye or sleeve carries at the end collar 78 and between the eye or sleeve and collar 78 carries the spring 79.

The pin of poppet 77 carries a washer 82 and lock nut 83. The shank 81 of poppet 77 carries a collar 84 and is arranged to move freely through poppet 85 which is fixedly mounted in the frame unit 14. Between collar 84 and poppet 85 the shank 81 carries spring 86.

The pressure chamber or cylinder 88 is fixed to the frame unit by screws 89 and 90 and the plunger 91 therein contacts with the face of the rounded boss 87 of lever 71. Plunger 91 moves through gland 92 which is fixed to the pressure chamber or cylinder 88 by means of bolts 93 and the chamber is maintained oil tight by means of packing washer 95 held between gland 92 and the inside face of the pressure chamber or cylinder. Fluid is fed to the pressure chamber by means of conduit 94 and the pressure chamber or cylinder is vented by means of vent 96 operated through vent screw 97.

The operation of this locking mechanism is as follows:—In order to lock the forme-inking rollers in the determined position, pressure is applied in the pressure chamber or cylinder 88 through conduit 94 in a manner hereinafter described. This causes the plunger 91 to move forward, thus turning lever 71 about stud 73 and moving wedge 66 into contact with the inclined surface of bearing 20. At the same time, the other end of lever 71 moves away from the bearing 20, moving shank 76 through the spring 79 in the same direction. This brings wedge 65 into contact with the upper inclined surface of bearing 20. The movement of the lever 71 also compresses spring 86 against poppet 85. Turn buckles 69 and 75 are provided so that the mechanism may be preset in the most efficient disposition on assembly.

The forme-inking roller bearing is therefore locked in a fixed and determined position, being unable to move in the vertical direction since it is confined by the upper and lower sides of the broached hole 19 in bearing 15 or in the horizontal direction since it is locked by the inclined surfaces which are in contact with wedges 65 and 66 which are held in a determined position by the slideways 60 and 61 and the plunger 91.

When the fluid pressure is released from pressure chamber or cylinder 88, spring 86 being in compression, causes the lever 71 to pivot about stud 73 thus releasing wedges 65 and 66 from contact with the respective inclined surfaces of bearing 20.

The fountain roller 11 (Figures 14 and 15) runs in the ink fountain 12 and is driven by gears 100, 101 which are themselves driven by the variable speed mechanisms described in British patent specification No. 331,570. The amount of ink flowing is controlled by the pressure of blade 103 upon ink drum 9, the pressure of the blade being controlled by screws or other well-known means.

It is essential to the success of such a mechanism that roller 11 shall be a determined distance from drum 9, thus controlling the amount of ink picked up by the drum 9, and thus, after the fountain has been lowered so that fountain roller 11 moves away from drum 9 in order to cut off the ink supply, it is necessary that fountain roller 11 shall take up exactly its original position in order to obtain again the same uniform quality of inking.

The ink fountain 12 pivots at each side upon a stud or spindle 104 which is carried, for freedom for a limited degree of axial movement by a bush 105 in the frame unit 14. The stud or spindle 104 carries rotatably and slidably mounted thereon gear 100 which meshes with gear 106 which is the gear on the fountain roller shaft. The stud or spindle 104 screws at the inner end into a tapped hole 107 drilled in the lug 108 on the underside of the fountain. The lug 108 is partially machined with a slot 109 to approximately half the depth of the hole 107, thus allowing the fountain to be moved away when the stud or spindle 104 is unscrewed and partially withdrawn from the inner end of the hole 107. The hydraulic cylinders 110, disposed one at each end of the fountain, are carried on brackets 111 which are bolted to the frame unit 14. Each plunger 112 works through a gland 113 which is held in position on the cylinder 110 by bolts 114 and 115 the whole being maintained oil tight by packing washer 116 which is maintained in compression by gland 113. Fluid is fed to the pressure chamber 117 of the cylinder 110 through conduit 118 and union 119 and passage 120. The upper face of plunger 112 contacts with a machined face 121 of a lug 122 carried on the underside of the fountain 12.

The fountain is designed so that the portion of the fountain on the side of stud or spindle 104 nearest to the plungers 112 is always heavier than the other side of the fountain, thus ensuring that when the fountain pivots about stud or spindle 104, when the pressure is removed from plungers 112, fountain roller 11 will be moved from contact with ink drum 9.

Stops are provided to limit the motion of the fountain in the direction of ink drum 9 and to this end adjustable screws 123 are carried in brackets 124, being locked in position by lock-nuts 125. The brackets 124 are bolted to the frame unit 14. The ends of the screws 123 are hardened and contact with the machined faces 126 of lugs 127 carried at the upper surface of the ink fountain. The screws 123 are provided with a very fine thread in order that very accurate adjustment of the ink fountain may be obtained.

Having now described in detail the mechanisms controlling the bearings of the resilient rollers and ink fountain it is necessary to describe the means of applying pressure to these devices and the means of controlling the pressure in order to obtain the necessary results.

It should be understood that any one of many well-known means may be employed for providing the fluid pressure for application to the bearings and other elements and the one hereinafter described is the one used in the preferred method of construction. It should, however, be noted that pressure may be applied through a series of hydraulic accumulators or through a single hydraulic accumulator, or in any other suitable manner and that whatever system of hydraulic pressure supply may be used the resulting effect upon the resilient rollers will be the same.

The motor 150 (Figure 2) drives, through shaft 151 and coupling 152 which may be flexible, the pump 153. The motor and pump are all carried on one bedplate 154.

The pump 153 is, for example, of the general construction described in British patent specification No. 341,667. It is equipped with 12 cylinders and has 3 delivery outlets 155, 156 and 157.

The maximum pressure of these delivery outlets may be varied by means described in the said specification. The pump 153 is fed from supply tank 158 through conduit 159.

Delivery 155 supplies fluid through conduit 160, three-way connection 163, and conduits 161 and 162, to the pressure chambers 37 of the distributor rollers which chambers are fed from conduits 161 and 162 through T pieces 164 and conduits 39.

Figure 15:
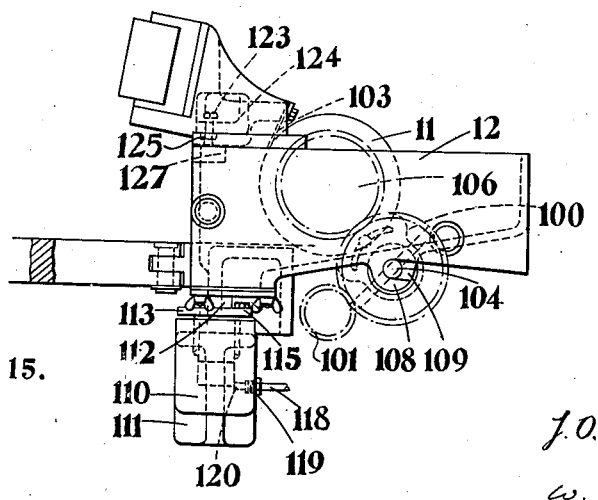
Figure 15 is an end-elevation of the ink fountain as shown in Figure 14, as seen from the side of the printing unit.

Conduits 161 and 162 also feed through T pieces 165 and conduits 118 and unions 119 the pressure chambers 117 of the cylinders 110 for operating the plungers 112 lifting the ink fountain (see Figures 14 and 15).

Conduit 161 carries between three-way connection 163 and T piece 165, T piece 189 which is connected to conduit 190 leading to a release valve 166. Conduit 191 leads from valve 166 to supply tank 158. Conduits 161 and 162 are connected together through elbows 167 and conduit 168, thus forming a closed circuit.

Conduit 168 is connected through T piece 169 and conduit 170 to pressure gauge 171 which shows the pressure in circuits 161, 162, 168.

The circuit comprising conduits 161, 162 and 168 supplies through T piece 172, conduit 172A and valve 273A and two unions of the four-way piece 282 conduits 94 which supply the fluid under pressure to the plungers 91 which operate the forme-inking roller locking mechanisms. The four-way piece 282 is further connected to valve 273 controlling conduit 284 which leads back to the supply tank 158.

Pump delivery 156 feeds through conduit 174 and three-way piece 175 conduits 176 and 177. Conduits 176 and 177 feed through T pieces or like fittings 178 and conduits 58 the union 57 of which supply pressure to plungers 52 which provide the throw-off force applied to the bearings of the resilient rollers. No release valve is contained in this circuit as the pressure in the circuit is necessarily constant and may be adjusted during assembly by the adjustment provided in the pump delivery.

Conduit 157 feeds through three-way piece 179 conduits 180 and 181. Conduits 180 and 181 feed through T pieces 182 conduits 183 and 184 which supply fluid under pressure through conduits 39 to pressure chambers 37 which control plungers 36, which apply pressure to the forme-inking roller bearings. Conduits 183 and 184 are connected through T pieces 185 to pressure gauges 186 and 187 which show the fluid pressure in conduits 183, 184.

Conduit 180 is connected to a release valve 188 by T piece 192 and conduit 193; conduit 194 leads from valve 188 to supply tank 158.

The circuits comprising the conduits 161, 162 and 180, 181 are connected through T pieces 125' and 126' and conduits 127 and 128 to hand operated pressure control valves 129 and 130 respectively. Valves 129, 130, the details of construction of which will be hereinafter described, are incorporated in their respective circuits in order to allow adjustment of the determined pressures. Conduits 131 and 132 lead from the outlet of valves 129 and 130 respectively to supply tank 158. Valves 129 and 130 are of the common form of hand adjusted needle valves and allow a small leak from their respective circuits, the amount of fluid passing the valves being constant in relation to the pressure in the circuits. Thus, by increasing or decreasing the aperture in the valve the pressure in the respective circuits may be easily varied.

Valves 166 and 188 are release valves and are connected to the two main circuits formed by the conduits 161, 162, 168 and conduits 180, 181. When the valves are closed the pressure is maintained in the respective circuits and when a valve is open the pressure is immediately released from the corresponding circuit and the fluid flows back through the valve to the supply tank 158. As these two circuits supply pressure to plungers 36 both for the forme-inking rollers and for the distributor rollers, it follows, therefore, that as soon as the pressure is released from these circuits, after the forme-inking rollers are unlocked the forme-inking and distributor rollers will be lifted out of contact with their respective drums and printing surfaces by reason of the pressure in conduits 176, 177 and which is maintained.

Figures 10, 11:
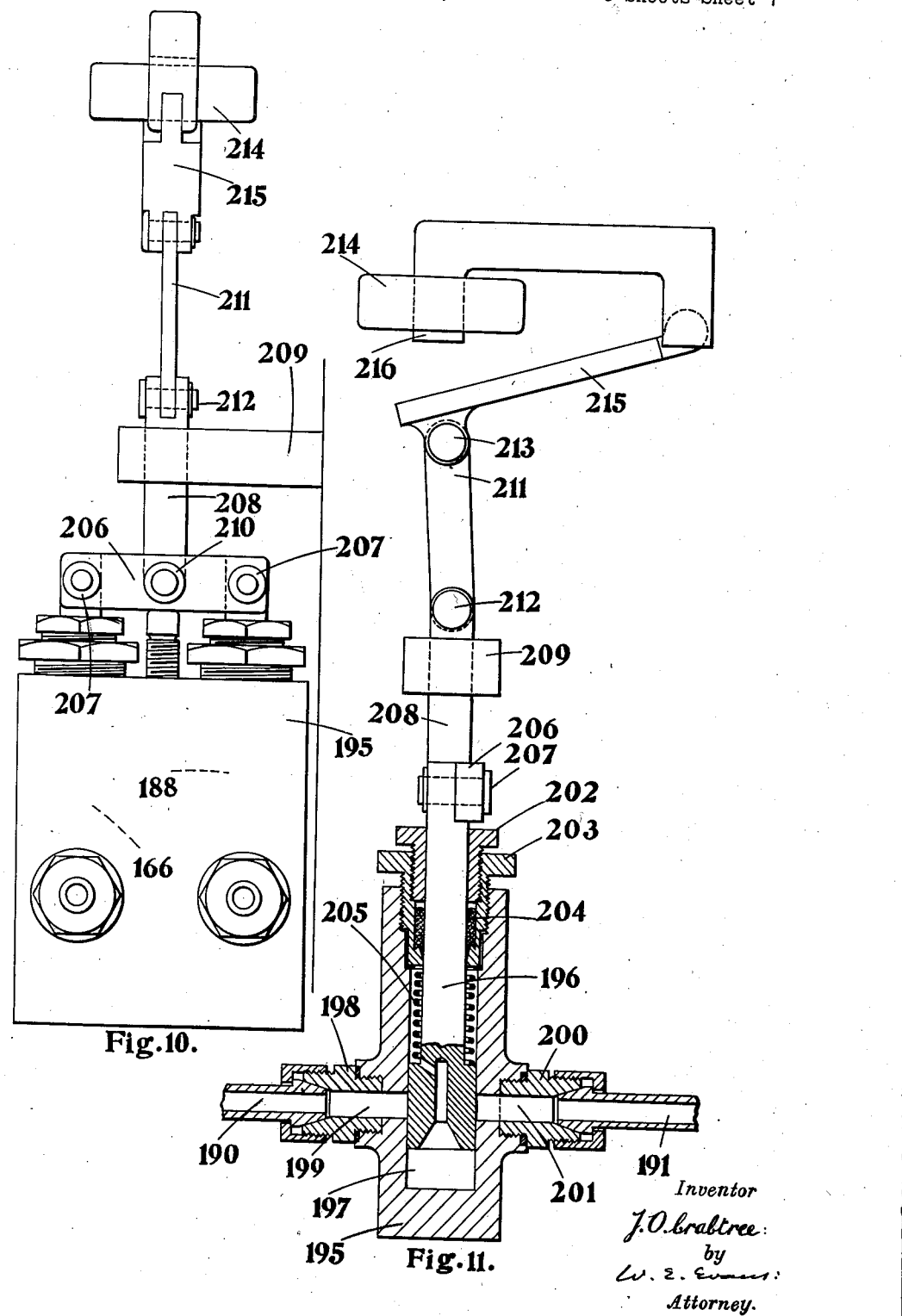
Figure 10 is a general arrangement showing the construction of a release valve for controlling the fluid pressure upon a group or groups of bearings.
Figure 11 is a fragmentary view of the mechanism as shown in Figure 10 illustrating the action of the valve and the control mechanism.

Valves 166 and 188 are combined into one body 195 (Figures 10 and 11). The two valves are of identical construction and each comprises a piston 196 operating in a cylinder 197 bored in the body 195. Conduit 190 is connected through union 198 to the inlet 199 of valve 166. Conduit 191 is connected through the union 200 to the outlet 201 of valve 166. Plunger 196 moves freely in the gland 202 which is screwed into the cover plate or stuffing box 203. Between the gland 202 and stuffing box 203 is carried packing washer 204 which prevents leakage of oil.

In order to open the valve, plunger 196 is lifted clear of valve inlet 199 and valve outlet 201, thus allowing the fluid to pass from the inlet to the outlet and thus through conduit 191, to the supply tank 158.

The movement of the plunger 196 when opening the valve is opposed by spring 205 which is compressed against the inside face of stuffing box 203.

Valve 188 is constructed substantially in accordance with the details hereinbefore described of valve 166 and is connected between the conduits 193 and 194. The two plungers 196 of valves 166 and 188 are connected by the coupling bar 206 and pins 207.

Plunger 208 fits slidably through guide 209 the shank of which is screwed into the frame, the plunger being fastened to the bar 206 by pin 210. Link 211 is connected to plunger 208 by pin 212 and to armature 215 of electro-magnet 214 by pin 213. Electro-magnet 214 is arranged to be electrically excited in a manner hereinafter described.

The operation of valves 166 and 188 is as follows:—

When the valves are closed and are in the position shown in Figures 10 and 11 of the drawings the hydraulic circuits they control are closed and the pressure is maintained. When electro-magnet 214 is excited by the means provided, armature 215 lifts and contacts with the face of the core 216 of the magnet, thus lifting through link 211, plunger 208 and bar 206, the two plungers 196 of valves 166 and 188 thus releasing the pressure in the two circuits 161, 162 and 188, 181. When the motion of the armature 215 raises the two plungers 196 it compresses spring 205 against the inside face of stuffing box 203. When the current is cut off from the windings of electro-magnet 214, thus de-exciting the magnet, the extension of the compressed springs 205 returns plungers 196 to their original positions, thus closing the valves and causing the pressure to be again built up in the two circuits.

Valves 273 and 273A (Figure 12) are piston valves and are designed substantially in accordance with the details of construction of valves 166 and 188 with the exception that the last named two valves are contained in one valve body and valves 273 and 273A are in separate bodies. The valve 273 is contained in a separate body 274 having inlet 275 and outlet 276. The operation of the valve is governed by piston 277 in substantially the same manner as that which applies with respect to plunger 196 in valves 166 and 188. In the same manner valve 273A is contained in the valve body 278 which is provided with inlet 280 and outlet 279. The operation of the valve is governed by plunger 281 and is substantially the same as the operation of either valve 166 or 188.

Inlet 280 of valve 273A is connected to conduit 168 through T piece 172 and conduit 172A. Outlet 279 of valve 273A is connected by conduit 282 to inlet 275 of valve 273. Conduit 282 contains four-way piece 283 the two free unions of which are connected to conduits 94 leading to plungers 91 operating the forme-inking roller locking mechanism. Outlet 276 of valve 273 leads directly back to the supply tank 158 through conduit 284.

Plungers 281 and 277 are connected by pins 285, 286 to bosses 287, 288 respectively of double bell crank lever 289 by way of oval or elongated holes. This lever is pivoted about stud 290 which is screwed into the press frame. Link 292 is connected to boss 291 of lever 289 by pin 293 and to the armature 295 of electro-magnet 296 by pin 294.

Plunger 281 carries a shank of diminished diameter 297 which passes through a hole 298 in guide 299 which is screwed into the frame. Shank 297 carries a collar 300 and between collar 300 and guide 299 a compression spring 301.

The operation of valves 273, 273A is as follows:

When the valves are in the position shown in Figure 12 valve 273A is closed and valve 273 is open. Thus the fluid under pressure in conduits 162, 161, 168, 172A is prevented by valve 273A from entering the circuit comprising conduits 282 and 94. Valve 273 is open, thus any fluid which may have been in the circuits 282, 94 will have flowed through conduit 284 back to the supply tank 158.

When electro-magnet 296 is excited by means hereinafter described, armature 295 moves into contact with the core 302 of the magnet 296, thus causing double bell crank lever 289 to pivot about stud 290 thus closing valve 273 and opening valve 273A. The fluid under pressure in conduits 161, 162, 168 and 172A is then free to flow into the circuit comprising conduits 282 and 94 and thus operates the plunger 91 locking the forme-inking roller bearings. At the same time, valve 273, being now closed, prevents the fluid passing straight through the valve through conduit 284 back to the supply tank and thus maintains the pressure in the whole circuits 161, 162, 168, 172A, 282 and 94. Simultaneously, by reason of the movement of double bell crank lever 289, the collar 300 on shank 297 moves towards guide 299, thus compressing spring 301.

When magnet 296 is de-excited the expansion of the compressed spring 301 causes collar 300 to move away from guide 299 thus pivoting double bell crank lever 289 about stud 290 and thus closing valve 273A and opening valve 273. In this manner the pressure is retained in circuits 161, 162, 168, 172A whilst the pressure is released in circuits 282 and 94, the fluid being allowed to flow back through valve 273 and conduit 284 to supply tank 158.

In this manner it is possible to release the lock on the forme-inking roller bearings while maintaining the pressure in circuit 161, 162, 168 controlling the distributor rollers.

Valves 129 and 130 are of the well-known needle type. The valve body 305 (Figure 13) is provided with inlet 306 and outlet 307 which are screwed into the body. Inlet 306 is connected to conduit 127 on valve 129 and to conduit 128 on valve 130 respectively, connections being made by unions 308. Outlet 307 is connected to conduit 131 on valve 129 and to conduit 132 on valve 130 respectively, connections being made by unions 308.

The valve seat 309 is machined with a small taper and is connected directly to inlet 306 through the small hole 310. The valve rod 311 carries a taper plunger head 312, the taper of which corresponds to the taper in the valve seat 309. The valve rod 311 has a screwed shank 313 which engages in the thread of the screwed locating piece 314. Locating piece 314 is locked against shoulder 315 in the valve body 305 by gland 316, packing washer 317 and the loose metal packing washer 318 which causes the washer 317 to expand and prevent the leakage of oil up the plunger rod 311. The latter carries at the upper end handwheel 319. The turning of hand-wheel 319 causes the plunger rod to be raised or lowered according to the direction in which it is turned by reason of the fixed position of the screwed locating piece 314. The raising or lowering of the taper plunger head 312 causes the valve aperture to increase or decrease in accordance with the movement of the plunger, and thus allows the adjustment of the pressure in the circuits containing the inlet conduits 127 or 128.

Motor 150 driving pump 153 may be any standard type of motor adapted to operate on the electrical supply available. It is arranged to be controlled from a position either on the unit or in conjunction with other motors from a position on the control station of the press.

Figure 16:
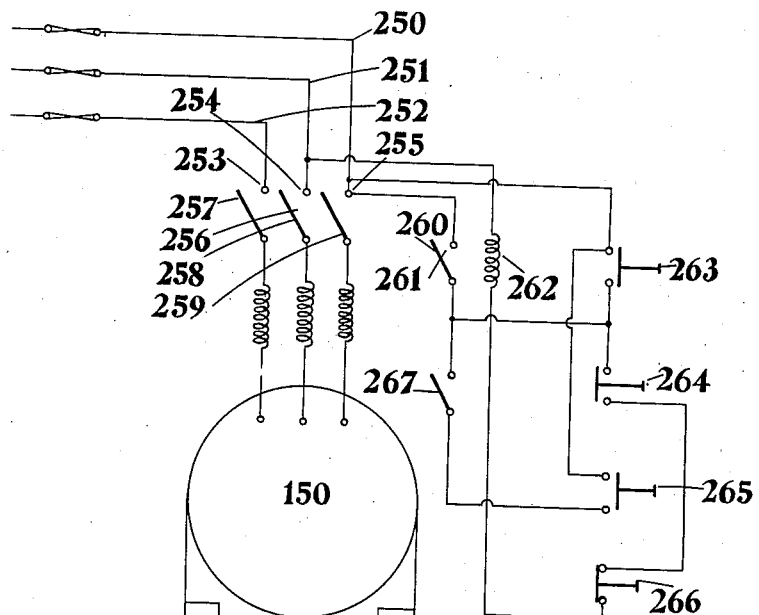
Figure 16 is a wiring diagram of the connections necessary in order to arrange that the motor controlling the supply of fluid pressure to the cistern may be controlled from the control station of the press.

For the purpose of this description the motor is considered to be operating on a standard 3-phase supply, the 3-phase wires 250, 251, 252 (Figure 16) being connected to poles 255, 254, 253 respectively of relay 256. The three contactors 259, 258 and 257 of relay 256 are connected to the corresponding terminals on motor 150. Relay 256 carries also contactor 260, the pole 261 with which this contactor "makes" being connected to pole 255. The relay contains the usual magnet 262. Start and stop buttons are provided on each unit and one set of start and stop buttons on the press control station. Start button 263 and stop button 264 are carried on the unit and start button 265 and stop button 266 are the two common control buttons carried on the press control station. The wiring from the control button to the relay starting the motor follows the commonly employed system for this type of motor and is as shown in Figure 16.

In order to isolate each individual unit, switch 267 is provided; when this contact is made it is possible to control the motor either from the press control station or from the unit. When the contact in switch 267 is broken, the motor may only be controlled from the control station on the unit.

The operation of electro-magnets 214 and 296 for controlling the rollers and locking the forme-inking rollers respectively is as follows:—

In general, the magnets are operated through relays contained in the control panel of the control station, the relays being designed to work between one phase wire of a 3-phase supply and the neutral wire. It should be noted that this arrangement is adopted in accordance with the necessities of a 3-phase four wire circuit as being one of the most common in general use, but the same control system can be used with slight modifications depending upon the supply for any other type of supply.

Figure 17:
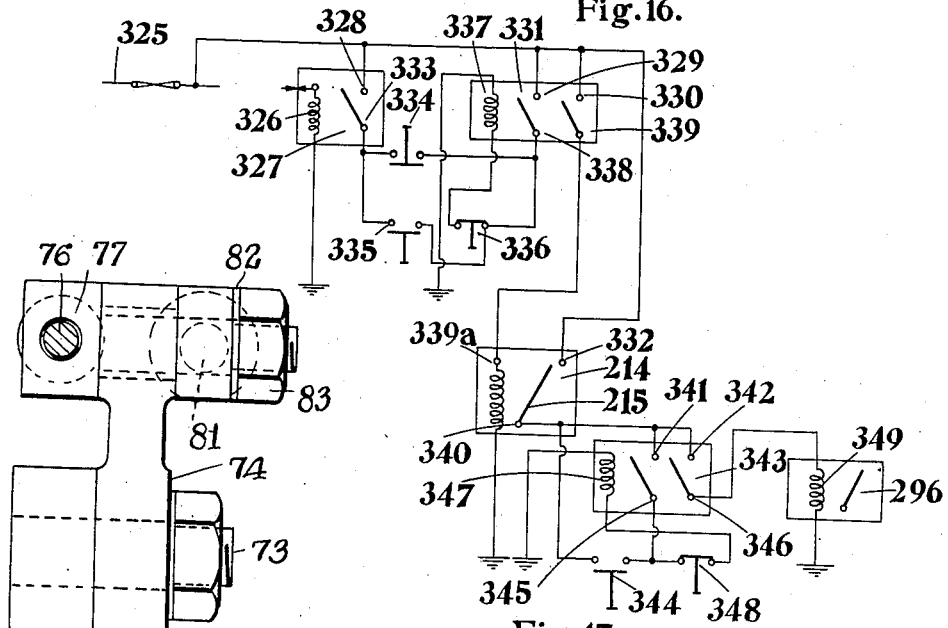
Figure 17 is a general wiring diagram showing the connections necessary in order to arrange for the mechanism to be capable of being controlled in conjunction with the control system of the press.

With particular reference to the circuit diagram (Figure 17) phase wire 325 is connected in series with the stop button circuit which may be connected again in series with an anti-winder device circuit such as is described in British patent specification No. 388,741, to the coil 326 of relay 327. The other end of coil 326 is connected to the neutral wire. Phase wire 325 is also connected to pole 328 of relay 327 and to poles 329, 330 of intermediate relay 331 and to armature contact 332 of magnet 214. Contactor 333 of relay 327 is connected to off-on contactor 334 which is contained in the brush gear of the main motor driving the press, and also to off-on switch 335 which is connected in series with on-off switch 336 which on one side is connected to coil 337 of relay 331, the other end of coil 337 being connected to the neutral wire. Contactor 338 is connected to on-off switch 336, and contactor 339 of relay 331 is connected to one end of the coil 339a of magnet 214, the other end of coil 339A being connected to the neutral wire. The armature 215 of magnet 214 is arranged to carry a contact 340 which, when the coil 339A is de-energized and the armature is in the inoperative position, is designed to feed the current from the phase wire 325 through the armature contactor. Armature contact 340 is connected directly to contacts 341, 342 of relay 343. Contactor 345 of relay 343 is connected through on-off switch 348 to one end of coil 347 of relay 343 the other end of coil 347 being connected to the neutral wire.

One pole of off-on switch 344 is connected to the adjacent pole of on-off switch 348.

Contactor 346 is connected directly to one end of coil 349 of magnet 296, the other end of coil 349 being connected directly to the neutral wire.

The circuit through brush gear contactor 334 is broken when the brush gear is in its lowest position and the motor is running at its slowest speed. As soon as the brush gear leaves this position and the motor begins to gain speed the contact is made.

When magnet 214 is de-excited the valves 166 and 188 are closed and the pressure is maintained in the circuit formed by conduits 161, 162, 168 and the circuit formed by conduits 180, 181, thus maintaining the rollers in contact with their respective drums and cylinders. When magnet 296 is de-excited, valve 273a is closed and valve 273 is open, thus releasing the fluid pressure in circuit 282 and conduit 94 and maintaining the forme-inking rollers in an unlocked position.

When the press is stationary and motor 150 driving pump 153 is running, fluid is being supplied from the pump to the three delivery outlets. If the rollers are out of contact with their respective drums and printing surfaces, magnet 214 is excited and magnet 296 is de-excited.

In order to set the forme-inking and distributor rollers in contact with their respective drums and printing surfaces, on-off button 336 is pressed. Before pressing this button current is flowing from phase wire 325 through the coil 337 of the relay 331 by way of contactor 338 and through contactor 339 to the coil 339A of magnet 214, thus energizing the magnet and releasing the pressure from the two circuits before referred to. Relay contact 331 is maintained closed by reason of the current flowing from phase wire 325 through pole 329, contactor 338, on-off switch 336 through coil 337 thus maintaining the coil energized. The pressing of on-off button 336 momentarily breaks the circuit 325, 329, contactor 338, at the on-off switch position. The breaking of this circuit causes relay 331 to open and remain open due to the fact that when the on-off button returns and contacts between the two poles the circuit between pole 329 and contactor 338 of relay 331 is broken. The opening of relay 331 at contactor 339 causes the coil 339A of magnet 214 to become de-excited, thus allowing the magnet to open under the action of the compression springs 205 and to close valves 166 and 188.

When electro-magnet 214 becomes de-excited the armature contacts with pole 332.

In order to operate the forme-inking roller locking mechanism off-on switch 344 is pressed. This allows current to flow from phase wire 325 through pole 332, armature contact 340, off-on switch 344, on-off switch 348, to coil 347 of relay 343, thus closing the relay. The closing of relay 343 allows the current to flow by an alternative route from armature contact 340 through pole 341 to contactor 345, on-off switch 348 to coil 347, thus maintaining relay 343 closed when off-on button 344 is released. The closing of relay 343 also allows current to flow through pole 342, contactor 346 to coil 349 of magnet 296 thus exciting the magnet. This causes valve 273a to open and valve 273 to close as hereinbefore described, allowing the fluid to flow from circuits 161, 162, 168 to conduit 94 and operate the forme roller locking mechanism as hereinbefore described.

In order to unlock the forme-inking rollers without releasing the forme-inking and distributor rollers from contact with their respective drums and cylinders, on-off switch 348 is pressed. The pressing of on-off switch 348 breaks the circuit allowing the current to flow to coil 347 maintaining the relay closed, thus causing the relay 343 to open. The opening of relay 343 breaks the circuit from phase wire 325 through contact 332, through armature contactor 340, through pole 342 and contactor 346 to the coil 349 of magnet 296, thus de-exciting the magnet and unlocking the forme-inking rollers.

When the press is running at speed and is stopped either by the stop button being pressed or a paper break causing the anti-winder device to operate and stop the press, the rollers are thrown out of contact. When the press is running at speed contact 334 controlled by the brush gear is closed as hereinbefore described. When the press is stopped by one of the means described above, current ceases to flow to the coil 326 of relay 327, the relay thus becoming de-energized and opening. The opening of relay 327 causes contactor 333 to make contact with pole 328, thus causing current to flow from phase wire 325 through pole 328, contactor 333, brush gear switch 334, on-off switch 336 to coil 337 of relay 331, thus causing relay 331 to close. The closing of relay 331 causes current to flow through pole 329, contactor 338, on-off switch 336, through coil 337, thus providing an alternative route for the current and maintaining the relay closed. The closing of relay 331 also allows current to flow from phase wire 325 through pole 330, contactor 339 to coil 339A of magnet 214, thus energizing the magnet and opening valves 166 and 188 as hereinbefore described. The energizing of magnet 214 by the means just described causes the contact between armature contact 340 and pole 332 to be broken thus causing relay 343 to open and magnet 296 to become de-energized, thus releasing the forme-inking roller locking mechanism. As relay 343 becomes de-energized, the maintaining circuit through pole 341, contactor 345, on-off switch 348 to coil 347, is broken, thus preventing the closing of relay 343 due to the contacting of armature contact 340 with pole 332 without the intervention of the controlling device previously described.

I claim:

1. In a rotary printing press, means for maintaining contact between the forme-inking and ink distributor rollers and the printing surfaces and ink distributing drums, comprising bearings which are adjustable towards and away from the surfaces on which the rollers are to be applied, fluid pressure chambers disposed in fixed position in relation to the said surfaces and movable elements within the said pressure chambers which are provided to act upon the said bearings to press the forme-inking and ink distributor rollers into contact with the said printing surfaces and ink distributing drums respectively, and means for the supply of fluid under pressure to the said pressure chambers.

2. In a rotary printing press provided according to claim 1, a circuit for the fluid under pressure which is common to a number of fluid pressure chambers and means for the control of the pressure within the said circuit.

3. In a rotary printing press according to claim 1, elements subjected to pressure and acting in opposition to the pressure exerted by the fluid pressure chambers.

4. In a rotary printing press according to claim 1, fluid pressure chambers and elements therein that are movable under pressure for opposing the pressure exerted by the fluid pressure chambers in the direction of the said surfaces.

5. In a rotary printing press according to claim 1, spring elements for acting in opposition to the fluid pressure chambers provided with the elements for pressing the bearings in the direction of the surfaces to which the rollers are applied.

6. In a rotary printing press according to claim 1, locking devices applied to the bearings of certain of the rollers for restricting the movement in the direction opposite to that resulting from the operation of the fluid pressure chambers.

7. In a rotary printing press according to claim 1, a motor for driving the press, electrical circuits for determining the operation of the said motor, electrical control means operating in conjunction with the said electrical circuits and valves arranged in the circuits for fluid pressure medium supplying the fluid pressure chambers such that by control of the electrical circuits of the motor the circuit of the fluid pressure chambers is controlled to effect the withdrawal of the elements pressing the bearings in the direction of the surfaces.

8. In a rotary printing press according to claim 1, a plurality of sources of control of the fluid pressure circuit supplying the fluid pressure chambers.

9. In a rotary printing press according to claim 1, control means applied in respect of at least one of the rollers for varying the pressure of contact between the roller and the surface to which it is applied.

10. In a rotary printing press comprising at least one set of printing couples in which the ink is distributed by means of resilient rollers running in contact with non-resilient cylinders and in which an actual reciprocatory movement between the rollers and the cylinders is provided for, bearings for certain of the said resilient rollers mounted for movement in a direction normal to the axis of the corresponding roller, means for maintaining the said resilient rollers in contact with the surfaces to which they are applied by fluid pressure, comprising fluid pressure chambers, elements movable within the said chambers and acting upon the bearings of the said rollers, means for the supply of fluid medium under pressure to the said fluid pressure chambers, and means for regulating such supply.

11. In a rotary printing press according to claim 10, a number of sources of fluid medium under pressure, and conduits leading to the bearing of the rollers to be adjustable in position from the said sources, a single pressure source being provided for each roller.

12. In a printing press according to claim 10, a single source of fluid medium under pressure provided to exert the fluid pressure in the fluid pressure chambers of a group of at least two roller bearings.

13. In a printing press according to claim 10, a common source of fluid medium under pressure provided to exert the fluid pressure in the fluid pressure chambers of the bearings of all the rollers that are adjustable.

14. In a printing press according to claim 10, an ink fountain and inking roller movable to and away from the printing position, and means comprising fluid pressure chambers and elements movable therein to adjust the position of the said fountain and the said roller.

15. In a printing press according to claim 10, means for locking the bearings of the adjustable rollers in determined position, the said means comprising oppositely acting wedge members and fluid pressure chambers and movable elements therein for adjusting the position of the said wedge members.

16. In a printing press according to claim 10, means for locking the bearings of the adjustable rollers in determined position, the said means comprising oppositely acting wedge members and fluid pressure chambers and movable elements therein for adjusting the position of the said wedge members, the said wedge members being linked together for operation by a single fluid pressure chamber.

JOHN OLDFIELD CRABTREE.